United States Patent
Krupke

(10) Patent No.: US 7,061,958 B2
(45) Date of Patent: *Jun. 13, 2006

(54) DIODE-PUMPED ALKALI LASERS (DPALS) AND AMPLIFIERS (DPAAS) WITH REDUCED BUFFER GAS PRESSURES

(76) Inventor: William F. Krupke, 1564 Foothill Rd., Pleasanton, CA (US) 94588

(*) Notice: Subject to any disclaimer, the term of this patent is extended or adjusted under 35 U.S.C. 154(b) by 197 days.

This patent is subject to a terminal disclaimer.

(21) Appl. No.: 10/746,525

(22) Filed: Dec. 24, 2003

(65) Prior Publication Data

US 2004/0136429 A1 Jul. 15, 2004

Related U.S. Application Data

(63) Continuation-in-part of application No. 10/000,508, filed on Oct. 23, 2001, now Pat. No. 6,643,311, and a continuation-in-part of application No. 10/658,857, filed on Sep. 9, 2003, and a continuation-in-part of application No. 10/024,127, filed on Dec. 17, 2001, now Pat. No. 6,693,942.

(51) Int. Cl.
*H01S 3/22* (2006.01)

(52) U.S. Cl. .......................................... 372/55; 372/56
(58) Field of Classification Search .................... 372/55
See application file for complete search history.

(56) References Cited

U.S. PATENT DOCUMENTS 6,643,311 B1 * 11/2003 Krupke ........................ 372/56

* cited by examiner

*Primary Examiner*—Minsun O. Harvey
*Assistant Examiner*—Dung Nguyen
(74) *Attorney, Agent, or Firm*—John P. Wooldridge

(57) ABSTRACT

A new class of lasers is provided that can be pumped by conventional high-power, multi-mode, broadband 1-D and 2-D laser diode arrays with spectral widths greater than 0.01 nm, where the pumped laser gain medium comprises an atomic vapor of one the alkali elements (Li, Na, K, Rb or Cs), buffered with a mixture of rare-gas (He, Ar, Kr, Ne or Xe) and selected molecular gases. The alkali atom gain medium is pumped at a wavelength matching the wavelength of the $^2S_{1/2}$–$^2P_{3/2}$ electric-dipole-allowed transition (the $D_2$ transition). After kinetic relaxation of pump excitation to the excited $^2P_{1/2}$ electronic level, laser emission takes place on the $^2P_{1/2}$–$^2S_{1/2}$ transition (the $D_1$ transition).

41 Claims, 4 Drawing Sheets

DIODE-PUMPED ALKALI LASERS (DPALS) AND AMPLIFIERS (DPAAS) WITH REDUCED BUFFER GAS PRESSURES

This is a continuation-in-part of U.S. patent Ser. No. 10/000,508 U.S. Pat. No. 6,643,311, titled "Diode Pumped Alkali Laser," filed Oct. 23, 2001, issued Nov. 4, 2003 and incorporated by reference.

This is a continuation-in-part of U.S. patent application Ser. No. 10/658,857, titled "Diode Pumped Alkali Amplifier," filed Sep. 9, 2003 and incorporated by reference.

This is a continuation-in-part of U.S. patent application Ser. No. 10/024,127, titled "Diode-Pumped Visible Wavelength Alkali Laser," filed Dec. 17, 2001 now U.S. Pat. No. 6,693,942 and incorporated by reference.

BACKGROUND OF THE INVENTION

1. Field of the Invention

The present invention relates to high power lasers and amplifiers, and more specifically, it relates to alkali vapor lasers and amplifiers pumped with at least one laser diode that has a spectral width of at least 0.01 nm.

2. Description of Related Art

The largest market currently for high-power (>kilowatt) lasers is for the materials processing applications of sheet-metal cutting and welding.

Application end-users continue to call for multi-kilowatt lasers with improved output beam quality, wavelengths that are <1060 nm, higher efficiency and compactness, and decreased cost-of-ownership, compared to traditional lamp-pumped Nd:YAG solid state lasers and electrically-pumped $CO_2$ gas lasers.

The near-diffraction-limited (i.e., $M^2$<2 or 3, where $M^2$ is the times-diffraction-limit factor) feature provides for greater intensity on the work-piece, for a focusing lens having a given f/number. Shorter wavelengths in general result in enhanced absorption efficiency in most metals and allow for power delivery to the work piece by optical fiber. Higher efficiency and compactness generally lead to low cost of ownership.

The direct use of high-power 2-D laser diode arrays for material processing applications has been of great interest in the past few years. However, the output beam of a high-power (60 watt) linear bar array of laser diodes is typically >1000 times the diffraction limit, and that of a 2-D stack of bar array is typically more than several thousand times the diffraction limit. Efforts continue to improve beam quality of 1-D and 2-D laser diode arrays, but cost effective methods appear to be complex and expensive.

An alternative means of effectively improving the beam quality and/or spectral width of highly multi-mode 1-D and 2-D laser diode arrays is to use them to pump another laser, whose output beam can be extracted in a low order spatial mode (e.g., near-diffraction-limited, or $M^2$=2 or 3), and/or with a greatly reduced spectral width. In effect the pumped laser becomes a "spatial and/or spectral brightness converter", trading a small loss in energy efficiency for a much greater gain in beam quality and/or spectral narrowness. The diode-pumped solid-state laser (DPSSL) is such a brightness converter. Nd:YAG DPSSLs have been developed recently that exhibit increased efficiency and beam quality compared to traditional lamp pumped devices.

Notwithstanding the reduced (~⅓) thermal loading realized by diode pumping (compared to lamp pumping), practical, near-diffraction-limited, multi-kilowatt Nd:YAG DPSSLs have remained elusive because of severe thermally induced focusing and stress-birefringence present in solid state laser hosts, such as YAG.

In light of the foregoing, the need continues for a cost-effective solution for an efficient, compact, multi-kilowatt laser source emitting at a wavelength <1060 nm, and with a near diffraction-limited and/or narrow-spectral-band output beam.

SUMMARY OF THE INVENTION

It is an object of the present invention to provide an alkali vapor laser capable of being optically pumped with at least one laser diode that has a spectral width of at least 0.01 nm.

It is an object of the present invention to provide an alkali vapor laser having laser diode array pumping mechanism that has a spectral width of at least 0.01 nm for pumping an optical cell that include an alkali vapor selected from the group consisting of cesium (Cs), rubidium (Rb), potassium (K), sodium (Na), and lithium (Li).

Another object of the invention is to include a buffer gas in an alkali vapor optical cell that is optically pumped with a laser diode array pumping mechanism that has a spectral width of at least 0.01 nm, where the buffer gas is selected from the group consisting of rare gases and light molecular gases.

Still another object of the invention is to include in an alkali vapor optical cell the rare gases of xenon, krypton, argon, neon, and/or helium.

An object of the invention is to include in an alkali vapor optical cell the light molecular of hydrogen, methane, ethane, propane, and/or their deuterated analogues, where the cell is pumped with at least one laser diode that has a spectral width of at least 0.01 nm.

An object of the invention is to provide a means for off-axis coupling of linearly-polarized radiation from a pump laser into an alkali vapor gain medium, where the linearly-polarized radiation couples into the gain medium without passing through the input mirror and the gain medium is pumped with at least one laser diode that has a spectral width of at least 0.01 nm.

Another object of the present invention is to provide an alkali vapor laser where laser radiation at wavelength $\lambda_1$ is generated in a linear polarization orthogonal to the pump radiation that has at least one laser diode with a spectral width of at least 0.01 nm.

Another object is to provide a method for converting spectrally relatively broadband radiation from a pump semiconductor diode laser array into spectrally narrowband output laser radiation from an alkali/buffer-gas gain mixture pumped with at least one laser diode that has a spectral width of at least 0.01 nm.

Still another object is to provide a method for converting the substantially divergent multi-spatial-mode of semiconductor diode laser array pump radiation having a spectral width of at least 0.01 nm into a near diffraction-limited, near-single-spatial-mode, coherent laser radiation from an alkali/buffer-gas gain mixture.

These and other objects will be apparent to those skilled in the art based on the teachings herein.

The present invention provides an efficient, compact, high-power, near diffraction-limited laser source emitting at a wavelength <1060 nm. The invention is a new class of lasers that can be pumped by conventional high-power, multi-mode, broadband 1-D and 2-D laser diode arrays, where the pumped laser gain medium comprises an atomic vapor of one the alkali elements (Li, Na, K, Rb or Cs), buffered with a mixture of rare-gas (He, Ar, Kr, Ne or Xe)

and selected molecular gases. Given the central role of the alkali atomic vapor as the active laser entity, this new type of laser is herein designated as the diode-pumped alkali laser (DPAL).

The three lowest-lying electronic levels of the alkali atom are utilized in the present DPAL designs, which is a classic "three level laser". In the DPAL laser, the alkali atom gain medium is pumped at a wavelength matching the wavelength of the $^2S_{1/2}-^2P_{3/2}$ electric-dipole-allowed transition (the $D_2$ transition). After kinetic relaxation of pump excitation to the excited $^2P_{1/2}$ electronic level, laser emission takes place on the $^2P_{1/2}-^2S_{1/2}$ transition (the $D_1$ transition).

In DPAL operation, pump radiation centered at the pump wavelength $\lambda_p$ of the $D_2$ transition, is directed into a gain cell containing alkali atoms and buffer gases. The alkali atoms in the gain cell are selectively pumped to the $D_2$ transition, whereupon they collisionally relax to the lower-lying $D_1$ transition before they can radiatively decay back to the ground level. The buffer gas also serves to collisionally broaden the alkali D-transitions.

The $D_2$ transitions for Cs, Rb, and K lie in the spectral region (760–850 nm) for which powerful and efficient high power laser diode arrays are commercially available. Therefore, these particular alkali atoms are utilized in preferred DPAL embodiments.

A basic DPAL device configuration takes the form of an "end-pumped" configuration, accommodating the fact that a DPAL is a true three-level laser. In these designs the DPAL active medium is contained within a cell, which is fitted with flat optical windows at either end to contain the alkali atomic vapor. The window at the pump end of the apparatus is coated on the exterior surface with a multilayer dielectric stack to form a mirror of the laser cavity. This mirror coating provides high transmission at the pump wavelength $\lambda_p$ and high reflectivity at the laser wavelength, $\lambda_l$. The window at the other end of the cell (away from the laser diode pump array and pump light coupling lens) is coated on its exterior surface with an anti-reflection layer for both pump and laser wavelengths. The laser cavity is completed with a second mirror placed along the axis of the gain cell. This mirror is configured to permit only the fundamental (or other desired low-order) spatial mode of the resonator to oscillate. The output mirror is coated to have a high reflectivity at the pump wavelength, to reflect pump radiation that was not absorbed during a first pass through the cell to return generally parallel to the cell axis for a second pass. The coating on the output mirror is also designed to provide a reflectivity at the laser wavelength that optimizes the output coupling of laser radiation generated within the gain cell, and maximizes the efficiency of the DPAL.

To energize the DPAL, pump radiation provided by a laser diode pump array having a wavelength centered at the $D_2$ transition is coupled by a lens into the gain cell generally along the cell axis, through the end mirror on the cell, and double-passed through the cell following reflection from the high reflectivity mirror placed at the other end of the gain cell. Laser radiation generated within the gain cell at the wavelength matching the wavelength of the $D_1$ transition is extracted through the partially transmitting output mirror.

An alternative preferred DPAL embodiment has a thin-film polarizer that is inserted between the diode pump array and the alkali gain cell. The cell windows are AR coated on their exterior surfaces to maximize transmission at pump and laser wavelengths. Polarized pump radiation is coupled into the apparatus by passing through the thin-film plate polarizer with high transmission, and is focused within the cell to provide good spatial overlap with a low-order spatial mode of the laser cavity. The laser cavity is formed between the highly reflecting (at pump and laser wavelengths) mirror and the output coupling mirror. Laser action in the pumped cell is set up in a polarization perpendicular to that of the pump radiation due to the presence of the thin-film plate polarizer within the laser cavity.

In another DPAL embodiment, the radiation from a 2-D laser diode pump array is coupled into the gain cell using a hollow lens-duct. An unstable laser cavity is formed by a dot-mirror placed in the center of a cell window. An anti-reflection coating is placed on the cell window in the annular region surrounding the high-reflectance dot mirror. Pump radiation is coupled into the gain cell in this annular region and propagates through the cell reflecting from a mirror coating placed on the outer barrel of the transparent-walled cell.

Many other embodiments for DPAL type devices will be obvious to those skilled in the art based on the teachings herein. Spectrally narrow laser operation can be further enhanced by incorporating a birefringent filter (BRF) within the laser cavity. Unexpectedly high pump power absorption efficiency can be realized in a DPAL device because it proves possible to effectively couple much of the pump power into the alkali atoms through the Lorentzian wings of the pump transition.

DETAILED DESCRIPTION OF THE INVENTION

Figure 1:
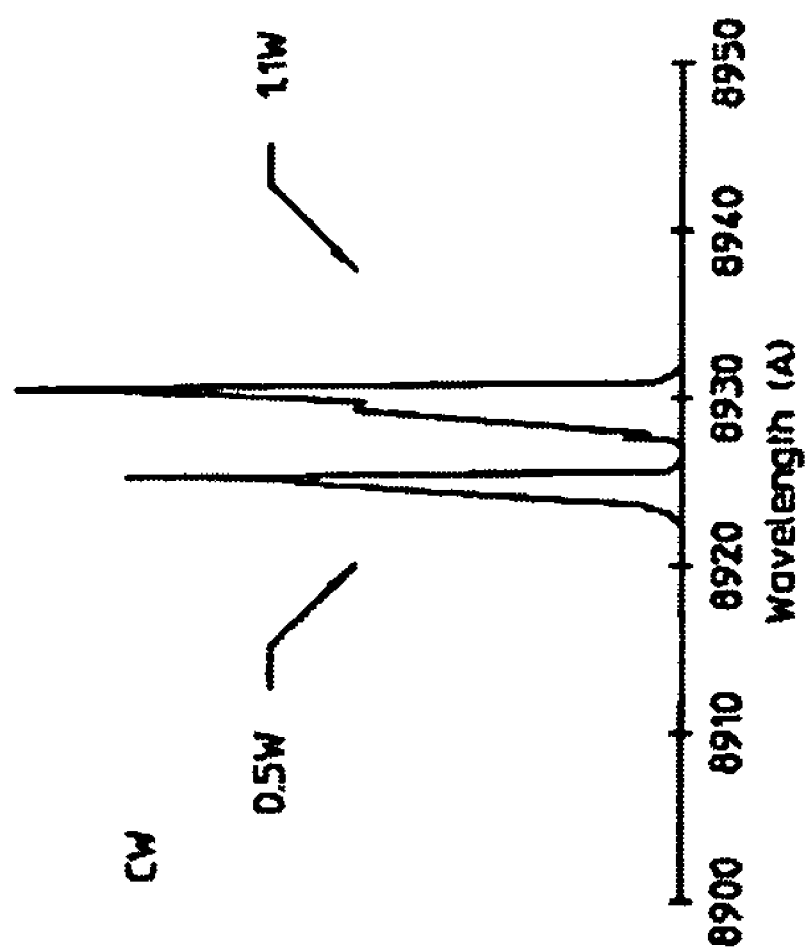
FIG. 1 is a plot of CW emission wavelengths for an exemplary semiconductor laser formed in accordance with U.S. Pat. No. 6,195,381.

One of the critical requirements necessary to the realization of an efficient DPAL or Diode Pumped Alkali Amplifier (DPAA) device is that the $D_2$ pump transition be effectively spectrally homogeneous. Under physical conditions of interest to DPAL and DPAA operation, the degree of spectral homogeneity of the $D_2$ pump transition is determined by the gas temperature and by the partial pressure of a buffer gas such as helium. In the limit of no helium buffer gas, the spectral character of $D_2$ pump transition is determined essentially by Doppler broadening. The Doppler-broadened transition line-shape is Gaussian and the transition is spectrally inhomogeneous. However, in the presence of a sufficiently large partial pressure of helium buffer gas, collisions of the alkali atoms with the buffer gas atoms broaden and reshape the $D_2$ pump transition. When buffer gas collisions so dominate, the $D_2$ pump transition line-shape becomes Lorentzian and the transition becomes effectively spectrally homogeneous. For purposes of this disclosure, the $D_2$ pump transition is considered to be spectrally homogeneous when the collision-broadened linewidth is at least 10 times the Doppler linewidth. Once the pump transition becomes spectrally homogeneously broadened, pump radiation absorbed in the spectral wings of the pump transition contributes to DPAL laser gain just as effectively as pump radiation absorbed within the spectral half-width of the transition. This is important because it is impractical to collisionally broaden $D_2$ pump transitions so much that they are as broad as, or broader than, the typical spectral widths of commercial high power laser diodes. Thus, in designing practical DPAL devices there is always design tradeoffs to be made involving the helium buffer pressure and the spectral width of the pump laser diodes. In general, one is required to provide a certain minimum helium partial pressure to ensure that the $D_2$ pump transition is spectrally homogeneous. Higher helium partial pressure can then be utilized to accommodate even larger spectral widths of pump laser diodes.

To achieve a more quantitative picture of the pressure-linewidth design space, the linewidths and pressures of relevance must be estimated. For illustrative purposes, specific numbers for potassium, rubidium, and cesium alkali atoms, at a gas temperature of 100 C (a typical DPAL and DPAA operating temperature) are provided. First, a calculation is made of the $D_2$ pump transition Doppler linewidths (spectrally inhomogeneous transition). Next, a calculation is made of the helium partial pressures at which the collisional linewidths of the $D_2$ pump transitions for potassium, rubidium and cesium are 10 times larger than the Doppler widths. At or above these partial pressures, the $D_2$ pump transitions are effectively spectrally homogeneously broadened and may usefully be excited in their spectral wings, as taught in U.S. Pat. No. 6,643,311.

Doppler linewidth:

$$\Delta v_D = 2(2R \ln 2)^{1/2} (T/M)^{1/2} (\lambda_o)^{-1}$$

where:
R=Gas constant
T=Temperature (K)
M=Mass number
$\lambda_o$=$D_2$ pump transition wavelength Using parameter values for K, Rb and Cs in proper units, the calculated Doppler linewidth (FWHM) values given in Table 1. The widths are given both in units of GHz and nm.

TABLE 1

K, Rb, and Cs $D_2$ transition Doppler linewidths (FWHM) at T = 100 C. (373 K)

| Alkali Atom | Mass No. | $\lambda_o$ (nm) | $\Delta v_D$ (GHz) | $\Delta \lambda_D$ (nm) |
|---|---|---|---|---|
| K, potassium | 40 | 766 | 0.852 | 0.00164 |
| Rb, rubidium | 85 | 780 | 0.569 | 0.00116 |
| Cs, cesium | 133 | 852 | 0.419 | 0.00102 |

Next, a calculation is made of the Lorentzian collisional linewidths (FWHM) of potassium, rubidium, and cesium as a function of the helium buffer gas number density (in amagats) or pressure (in atm), at a temperature of T=100 C.

Collision line-broadening:

$$\Delta v_L = \pi^{-1} Z_L = \gamma(v_T) N_T$$

where:
$Z_L$=number of He—Rb collision per second, per Rb atom
$\gamma(v_T)$=temperature dependent He—Rb collisional broadening coefficient
$v_T$=He═Rb collision speed at temperature, T
$N_T$=He number density in amg (1 amg=2.69×10$^{19}$ atoms/cc)

Utilizing the helium-alkali collisional broadening coefficients, $\gamma$, taken from the literature (for example, for Rb, Romalis [Phys. Rev. A56, 4569 (1997)]), values measured at other temperatures are converted to T=100. These $\gamma$ values are given in Table 2.

TABLE 2

K, Rb, and Cs $D_2$ transition collisional broadening $\gamma$ values (FWHM) at T = 100 C.

| Alkali Atom | $\gamma$ (GHz/amg) |
|---|---|
| K, potassium | 26.7 |
| Rb, rubidium | 18.6 |
| Cs, cesium | 21.7 |

Using the collisional broadening parameters in Table 2, the helium partial pressure, $P_{homogeneous}$ is calculated, at which the collisional linewidth is 10 times the Doppler width (rendering the $D_2$ transition essentially spectrally homogeneous). These partial pressures are given in Table 3, along with the transition spectral widths (FWHM) at those pressures (e.g., $\Delta \lambda_L = 10 \Delta \lambda_D$).

TABLE 3

K, Rb, and Cs critical helium partial pressures to render the $D_2$ pump transition spectrally homogeneous.

| Alkali Atom | $P_{homogeneous}$ (atm) | $\Delta \lambda_{L,min}$ (nm) |
|---|---|---|
| K, potassium | 0.436 | 0.0164 |
| Rb, rubidium | 0.420 | 0.0116 |
| Cs, cesium | 0.264 | 0.0102 |

From Table 3 it is seen that the $D_2$ pump transition becomes effectively spectrally homogeneously broadened at helium partial pressures of a few tenths of an atm, and that the corresponding linewidths (FWHM) are approximately 0.01 nm. Any pump source whose spectral width is larger than 0.01 nm may thus be utilized to effectively pump a DPAL, by virtue of predominantly wing-pumping of the $D_2$ pump transition.

Until recently, commercially available high power pump laser diode bars possessed spectral widths as narrow as 1 nm, but more typically in the range of 3–6 nm (that is >100 times the spectral width corresponding to spectral homogeneity of the alkali $D_2$ pump transitions). U.S. Pat. No. 6,643,311 asserted that practical DPALs could be realized using commercially available pump laser diodes with such large spectral widths through the mechanism of wing-pumping, and claimed pump spectral widths in the 1–6 nm range. To make practical multi-kilowatt class DPAL designs using such commercial pump laser diodes, helium partial pressures up to 10 atm would be adopted. Were cost-effective commercial diode pump sources with narrower spectral widths to become available, multi-kilowatt class DPALs and DPAAs could be designed using lower helium partial pressures, while maintaining overall pump coupling and laser efficiency. The ability to fabricate DPALs and DPAAs at lower working pressures would tend to lower the cost of such DPALs and DPAAs.

Recently, announcements forecasting the availability of commercial high power pump laser diode bars with significantly reduced spectral widths in the 0.1–0.5 nm range have appeared. The manufacture of such laser sources has been enabled by the development of certain advanced laser diode fabrication techniques and integrated micro-optics components originally developed for use in advanced telecommunications equipment For example, the company PD-LD Inc. of Pennington, N.J. has put the following information on their website indicating that the company had recently demonstrated a technology for greatly improving spectral characteristics of high power laser diodes by using proprietary holographic volume Bragg gratings (VBG™) to lock and narrow their emission wavelength. Table 4 illustrates these improvements by comparison with typical commercial high power laser diodes.

TABLE 4

| Laser type | Line width | λc control | dλ/dT |
|---|---|---|---|
| Commercial diodes | 3–6 nm | +/−3 nm | 0.3 nm/C |
| Commercial diode + VBG ™ | <0.5 nm | <+/−0.5 nm | 0.01 nm/C |

As Table 4 shows, the VBG™ element has the ability to transform a multimode high power laser diode or diode bar into extremely narrow-band emitters with precisely defined λc and a very low sensitivity to temperature changes. Such ability will most likely enable significant improvements in a variety of laser diode applications, such as pumping of the solid state lasers, sensing, chemical analysis and medical applications, to name a few. Note that the spatial beam quality of the spectrally-narrowed output is generally not improved over the diode output without the application of the Bragg grating element.

A PD-LD Inc. technical presentation indicates that a typical spectral width of 0.2 nm has recently been achieved and the prospects are good for realizing 0.1 nm, thus improving over the data given in Table 4 above.

Alfalight Laser Diode Company has recently licensed IP from the University of Wisconsin that is asserted to result in manufacturable high power multi-mode laser diodes with spectral widths of order 0.1 nm. See the FIG. 1 below (note: 1 nm=10 Angstrom).

FIG. 1 is taken from U.S. Pat. No. 6,195,381, which indicates that the figure illustrates the spectrum of the broad-area DFB laser of the invention appears to be single frequency near threshold with a temperature dependence of 0.6 .ANG./C and maintains a narrow linewidth at 1 W output power as shown by the right-hand peak in FIG. 1. The FWHM for the CW spectrum at 0.53 W is 0.5 .ANG. FWHM. At 1.1 W, if a width is approximated based on the envelope of the peaks, the spectrum broadens to about 0.9 .ANG. FWHM. Under quasi-CW conditions, the spectrum is broader than the CW spectrum, which can be attributed to thermal-induced and carrier-induced transients (chirp). The spectra measured for 5 .mu.s pulses at a frequency of 2 kHz yields widths of 0.9 .ANG. and 1.2 .ANG. FWHM at 0.5 W and 1.0 W, respectively. In contrast, the spectra near threshold of Fabry-Perot lasers have a width of over 10 .ANG. FWHM and reach 20 .ANG. FWHM at 1 W CW.

As shown below, the Alfalight approach to manufacturing involves the regrowth of a grating integrated into the semiconductor laser chip (a process which heretofore was a low-yield process, leading to high manufacturing cost). The new grating material composition is said to result in a high-yield regrowth process, and the anticipation of practical manufacturability.

Figure 2:
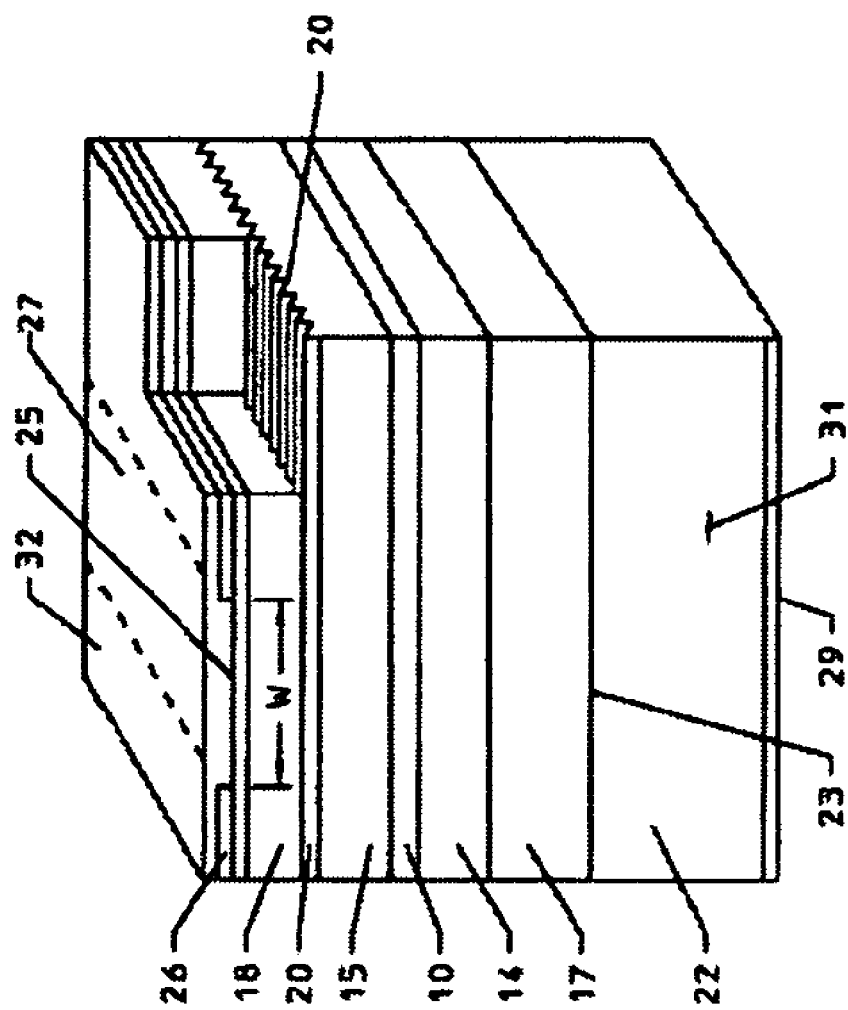
FIG. 2 is a perspective view of the exemplary semiconductor laser of FIG. 1.

FIG. 2 is taken from U.S. Pat. No. 6,195,381 B1, which indicates that the layers illustrated in the figure are epitaxially grown on a GaAs substrate 22. It is preferred that the top surface 23 of the substrate 22 be the (100) surface and that the epitaxial layers be grown on this surface exactly on orientation. For exemplification only, current confinement may be provided to define the emitting aperture by insulating layers 26 of SiO.sub.2 over a cap layer 25 of p+ GaAs, with a top metal electrode 27 in contact with the cap layer 25 at the top face of the laser between the insulating SiO.sub.2 layers to provide electrical conduction thereto. A bottom metal electrode 29 is formed on the bottom face of the substrate 22 so that voltage may be applied across the semiconductor laser between the electrodes 27 and 29. The width W of the metal electrode 27 in contact with the cap layer 25 defines the effective stripe width of the semiconductor diode in the active layer 10 at which light emission will occur."

The production in volume of such relatively narrowband high power pump laser diodes at not significantly higher prices than today's commercial pump diodes, permits the design and realization of lower cost DPAL and DPAA devices.

Specifically, the use of such relatively narrower-band-pump laser diodes allows the design and construction of DPAL and DPAA devices at a reduced buffer gas pressures, with more compact footprints, than feasible with today's commercial larger bandwidth pump diodes. Even with spectral widths as narrow as 0.1 nm (e.g., 10× greater than the linewidth at which the $D_2$ pump transitions become spectrally homogeneous), it is seen that these emerging narrowband commercial pump laser diodes will continue to predominantly excite the Rb vapor in the spectral wings of $D_2$ pump transitions, and will continue to exploit the inventive wing-pumping feature of the DPAL patent teaching.

Cost and other technical performance properties being equal, the availability of pump diode arrays having narrower spectral widths than presently commercially available pump diode arrays (1–6 nm) will enable a number of valuable trade-offs in DPAL design, to achieve higher DPAL performance, lower manufacturing cost, or both. The key tradeoff parameters include, output power, power conversion efficiency, alkali vapor pressure (operating temperature), buffer gas pressure, gain cell length, center-edge temperature gradient, and specific thermal power deposition. To illustrate just one form of tradeoff, the calculations given below present the dependence of DPAL output power as a function of buffer pressure, parametric in the ensemble averaged spectral width of a diode pump array delivering 7200 watts of power. The other key parameter assumptions for these calculations are listed in Table 5.

TABLE 5

Assumed key DPAL design parameters parametric performance calculations.

| Parameter | Value |
|---|---|
| Cell length | 50 cm |
| Cell diamter | 0.424 cm |
| Pump power | 7200 watts |
| Pump delivery efficiency | 0.95 |
| Pump irradiance | 48.4 kW/sq-cm |
| Pump second pass reflectivity | 0.99 |
| Single pass transmission | 0.95 |
| Mode fill efficiency | 0.9 |

Figure 3:
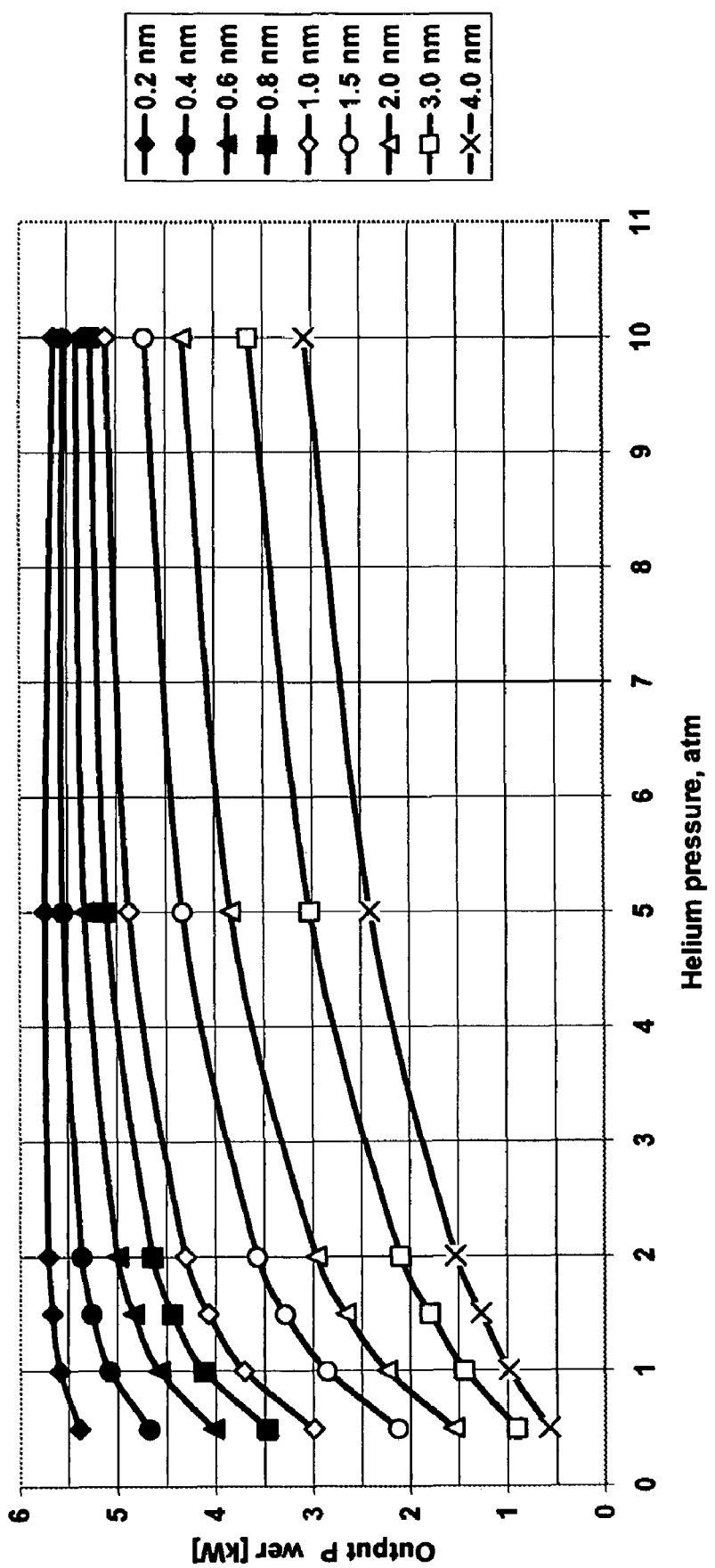
FIG. 3 shows calculated output power of a kW-class Rubidium DPAL pumped with 7.2 kW, as a function of helium buffer pressure (0.5–10 atm).

FIG. 3 shows the output power of a rubidium DPAL as functions of helium buffer pressure, parametric in the ensemble-averaged spectral width of the 7200 watt diode pump array. Note that the calculations are carried out for helium buffer pressures exceeding the minimum pressure (p>0.42 atm) required to render the rubidium D pump transition lineshape predominately Lorentzian (and effectively spectrally homogeneous). FIG. 3 shows, for example, that a 5 kW output could be achieved at a buffer pressure of ~1 atm using a pump array with an ensemble average spectral width of 0.4 nm, whereas as buffer pressure of >7 atm would be needed to achieve the 5 kW output power using a pump array with an ensemble average spectral width of 1.0 nm. The mechanical ease and cost of manufacturing a 5 kW rubidium DPAL at 1 atm buffer pressure would be substantially more favorable than for manufacturing a 5 kW rubidium DPAL at 7 atm (assuming that the cost and performance of each of the pumps arrays is the same, even though the spectral widths differ by a factor of two).

Figure 4:
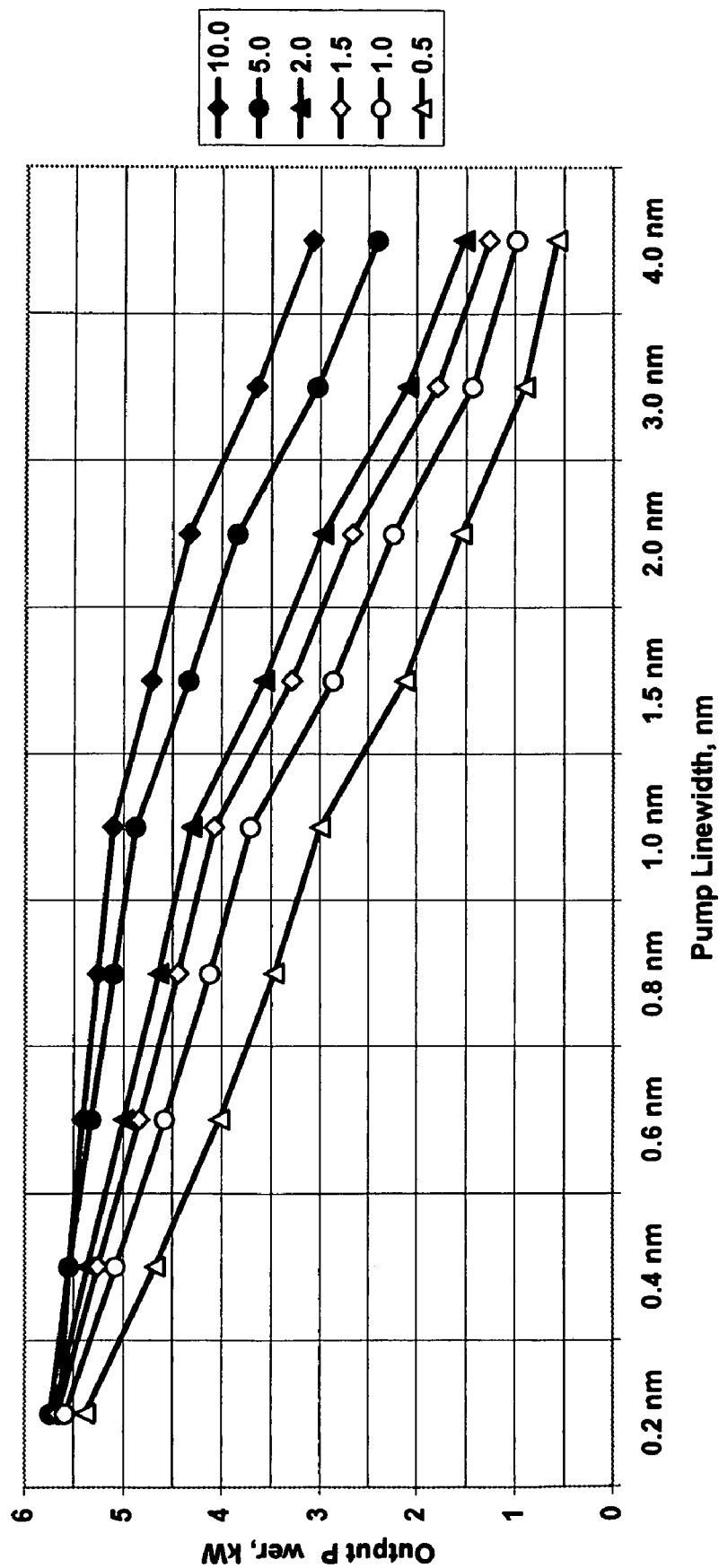
FIG. 4 shows calculated output power of a kW-class Rubidium DPAL pumped with 7.2 kW of pump power, as a function of pump array linewidth.

FIG. 4 shows the output power of a rubidium DPAL as a function of the ensemble-averaged linewidth of a 7200 watt diode pump array, parametric in the helium buffer pressure from 0.5 to 10 atm. Note again, that the calculations are carried out for helium buffer pressures exceeding the minimum pressure (p>0.42 atm) required to render the rubidium D pump transition lineshape predominately Lorentzian (and effectively spectrally homogeneous).

As seen from FIG. 4, the achievable output power of a rubidium DPAL falls from about 5.5 kW at 10 atm of helium pressure and 0.4 nm pump linewidth, to about 3 kW for a 10 atm helium buffer pressure and a 4.0 nm pump spectral width. At the lower buffer pressure of 0.5 atm, the average power falls from about 4.7 kW to about 1 kW, as the pump array linewidth varies from 0.4 nm to 3.0 nm. Thus, we observe that diode pump arrays with narrower linewidths permit the design of high-power DPALs at a given output power with lower helium buffer pressure. Using such tradeoff maps (including those with different assumptions of additional key parameters) provides a basis for optimizing the cost effectiveness of practical high power DPAL devices. Generally, the commercially-emergent diode pump arrays with relatively improved (smaller) ensemble-averaged linewidths in the 0.1 to 1.0 nm region, continue to exploit the inventive features of the DPAL concept (most significantly wing pumping of a homogeneously broadened $D_2$ pump transition) while enabling potentially more cost-effective DPAL devices.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. An alkali vapor laser, comprising:
an optical cavity resonant at a wavelength $\lambda_1$, corresponding to a wavelength of a $D_1$ transition of an alkali atomic vapor;
a gain medium within said optical cavity, said gain medium comprising a mixture of at least one buffer gas and said alkali atomic vapor having said $D_1$ transition wavelength matching said wavelength $\lambda_1$ of said optical cavity, wherein said at least one buffer gas has the dual purpose of collisionally broadening a $D_2$ transition of said alkali atomic vapor and collisionally transferring pump excitation from the upper level of said $D_2$ transition to the upper level of said $D_1$ transition at a rate larger than the radiative decay rate of either of these two levels; and
a pump laser emitting pump radiation at a wavelength $\lambda_2$ with an emission spectral width of at least 0.01 nm (FWHM), for optically pumping said gain medium at a wavelength of a said $D_2$ transition of said alkali atomic vapor, including optical pumping in the Lorentzian spectral wings of said $D_2$ transition, generating laser emission output at wavelength $\lambda_1$.

2. The alkali vapor laser of claim 1, wherein said optical cavity is formed by an input mirror and an output mirror.

3. The alkali vapor laser of claim 1, wherein said pump laser comprises at least one semiconductor diode laser emitting at said wavelength $\lambda_2$.

4. The alkali vapor laser of claim 1, further comprising an optical cell through which said mixture flows or is contained.

5. The alkali vapor laser of claim 1, wherein said alkali atomic vapor is selected from the group consisting of cesium (Cs), rubidium (Rb), potassium (K), sodium (Na), and lithium (Li).

6. The alkali vapor laser set forth in claim 1, wherein said at least one buffer gas is selected from the group consisting of rare gases and light molecular gases.

7. The alkali vapor laser set forth in claim 6, wherein said rare gases are selected from the group consisting of xenon, krypton, argon, neon, and helium.

8. The alkali vapor laser set forth in claim 6, wherein said light molecular gases are selected from the group consisting of hydrogen, methane, ethane, propane, and their deuterated analogues.

9. The alkali vapor laser of claim 2, wherein said output mirror of said optical cavity is partially transmitting at a wavelength $\lambda_1$, wherein said output mirror is substantially highly reflecting at a said wavelength $\lambda_2$.

10. The alkali vapor laser of claim 2, wherein said input mirror of said optical cavity is a dichroic mirror, substantially transmitting radiation at a said wavelength $\lambda_2$, and substantially reflecting at a wavelength $\lambda_1$.

11. The alkali vapor laser of claim 2, further comprising a thin-film polarizer plate optical element placed within said optical cavity, for coupling linearly-polarized radiation at said wavelength $\lambda_2$ from said pump laser into said gain medium, wherein said linearly-polarized radiation couples into said gain medium without having to pass through either of said input mirror or said output mirror.

12. The alkali vapor laser of claim 11, wherein laser radiation at wavelength $\lambda_1$ is generated in a linear polarization that is oriented orthogonally with respect to the polarization of said pump radiation.

13. The alkali vapor laser of claim 1, wherein said alkali atomic vapor is cesium and said at least one buffer gas comprises helium and ethane.

14. The alkali vapor laser of claim 3, wherein said at least one semiconductor diode laser emits at a wavelength of ~852 nm.

15. The alkali vapor laser of claim 3, wherein said at least one semiconductor diode laser comprises material selected from the group consisting of AlGaAs and InGaAsP.

16. The alkali vapor laser system of claim 1, wherein said optical cavity is resonant at a wavelength of ~894 nm.

17. The alkali vapor laser of claim 1, wherein said alkali atomic vapor is rubidium and said at least one buffer gas comprises helium and ethane.

18. The alkali vapor laser of claim 3, wherein said at least one semiconductor diode laser emits at a wavelength of ~780 nm.

19. The alkali vapor laser system of claim 1, wherein said optical cavity is resonant at a wavelength of ~795 nm.

20. The alkali vapor laser of claim 1, wherein said alkali atomic vapor comprises potassium and wherein said at least one buffer gas is selected from the group consisting of helium and argon.

21. The alkali vapor laser of claim 1, wherein said at least one semiconductor diode laser emits at a wavelength of ~767 nm.

22. The alkali vapor laser system of claim 1, wherein the said optical cavity is resonant at a wavelength of ~770 nm.

23. A method for converting spectrally broadband radiation from a pump semiconductor diode laser array into spectrally narrowband output laser radiation, comprising the steps of:
pumping, with a pump laser having an emission spectral width of at least 0.01 nm (FWHM), an alkali/buffer gas gain mixture at a wavelength $\lambda_2$ of a pressure-broadened $D_2$ transition of an alkali atomic vapor, wherein said mixture is optically pumped well into the Lorenizian spectral wings of said $D_2$ transition; and
extracting spectrally narrowband laser radiation generated on the a spectrally-homogeneous $D_1$ transition of said alkali atomic vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

24. A method for converting the substantially-divergent, multi-spatial-mode of semiconductor diode laser array pump radiation into a near diffraction-limited, near-single-spatial-mode, coherent laser radiation, comprising the steps of:
depositing said pump radiation at a wavelength $\lambda_2$ matching a wavelength of a $D_2$ transition of an alkali/buffer-gas gain mixture in a certain defined spatial volume (within a gain mixture cell placed in an optical cavity), including optical pumping in the Lorentzian spectral wings of said $D_2$ transition, wherein said pump radiation is provided by a multi-spatial-mode semiconductor diode laser array comprising an emission spectral width of at least 0.01 nm (FWHM);
spatially over-lapping said volume with the fundamental mode of said optical cavity, designed to possess substantially higher losses for higher order spatial modes than for the fundamental mode; and
extracting laser output power in the fundamental spatial mode of said optical cavity by providing the proper amount of transmission of radiation at an output wavelength $\lambda_1$ matching a wavelength of a $D_1$ transition of said alkali vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

25. The alkali vapor laser system of claim 4, wherein said optical cell comprises a main body with a mirror at a first end of said main body and a window at a second end of said main body, wherein said optical cavity includes a dot-mirror placed near the center of said window, wherein said end mirror and 5 said dot-mirror together form said laser cavity, wherein said window comprises an anti-reflection coating, wherein said pump laser comprises a laser diode array, wherein said alkali vapor laser further comprises a hollow lens duct positioned to direct said pump radiation from said pump laser through said window and into said optical cell.

26. An alkali vapor optical amplifier, comprising:
a gain medium comprising a mixture of at least one buffer gas and an alkali atomic vapor having a $D_1$ transition, wherein said at least one buffer gas has the dual purpose of collisionally broadening a $D_2$ transition of said alkali atomic vapor and collisionally transferring pump excitation from the upper level of said $D_2$ transition to the upper level of said $D_1$ transition at a rate larger than the radiative decay rate of either of these two levels; and
a pump laser emitting pump radiation at a wavelength $\lambda(D_2)$ with an emission spectral width of at least 0.01 nm (FWHM), for optically pumping said gain medium at a wavelength of said $D_2$ transition, including optically pumping in the Lorentzian spectral wings of said $D_2$ transition, wherein laser light at wavelength $\lambda(D_1)$ operatively passed through said gain medium will be amplified at a wavelength of said $D_1$ transition.

27. The alkali vapor optical amplifier of claim 26, wherein said pump laser comprises at least one semiconductor diode laser emitting at said wavelength $\lambda(D_2)$.

28. The alkali vapor optical amplifier of claim 26, further comprising an optical cell through which said mixture flows or is contained.

29. The alkali vapor optical amplifier of claim 26, wherein said alkali vapor is selected from the group consisting of cesium (Cs), rubidium (Rb), potassium (K), sodium (Na), and lithium (Li).

30. The alkali vapor optical amplifier of claim 26, wherein said at least one buffer gas is selected from the group consisting of rare gases and light molecular gases.

31. The alkali vapor optical amplifier of claim 30, wherein said rare gases are selected from the group consisting of xenon, krypton, argon, neon, and helium.

32. The alkali vapor optical amplifier of claim 30, wherein said light molecular gases are selected from the group consisting of hydrogen, methane, ethane, propane, and their deuterated analogues.

33. The alkali vapor optical amplifier of claim 30, wherein the alkali vapor is cesium and the buffer gases are helium and ethane.

34. The alkali vapor optical amplifier of claim 27, wherein said at least one semiconductor diode laser emits at a wavelength of ~852 nm.

35. The alkali vapor optical amplifier of claim 27, wherein said at least one semiconductor diode laser comprises material selected from the group consisting of AlGaAs, InGaAsP, and InGaAlP.

36. The alkali vapor optical amplifier of claim 26, wherein the alkali vapor is rubidium and the buffer gases are helium and ethane.

37. The alkali vapor optical amplifier of claim 27, wherein said at least one semiconductor diode laser emits at a wavelength of ~780 nm.

38. The alkali vapor optical amplifier of claim 27, wherein said alkali vapor comprises potassium and wherein said at least one buffer gas is selected from the group consisting of helium and argon.

39. The alkali vapor optical amplifier of claim 27, wherein said at least one semiconductor diode laser emits at a wavelength of ~766 nm.

40. The alkali vapor optical amplifier of claim 28, further comprising a hollow lens duct positioned to direct pump radiation from said pump laser into said optical cell.

41. A method for amplifying laser light, comprising:

pumping, with a pump laser having an emission spectral width of at least 0.01 nm (FWHM), an alkali/buffer gas gain mixture at a wavelength $\lambda(D_2)$ of a pressure-broadened $D_2$ transition of an alkali atomic vapor, wherein said mixture is optically pumped well into the Lorentzian spectral wings of said $D_2$ transition; and extracting spectrally narrowband radiation at a wavelength $\lambda(D_1)$ generated on a spectrally-homogeneous $D_1$ transition of said alkali atomic vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

* * * * *